W. D. KEMP.
GRASSHOPPER HARVESTER.
APPLICATION FILED JAN. 9, 1919.

1,325,475.

Patented Dec. 16, 1919.
3 SHEETS—SHEET 1.

INVENTOR
Walter Dewitt Kemp.

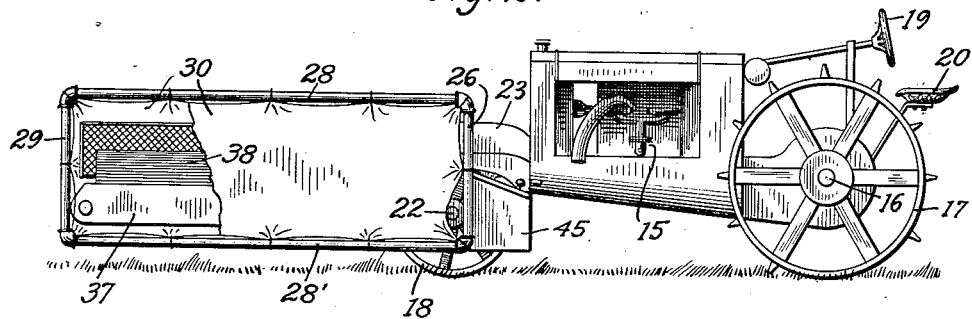
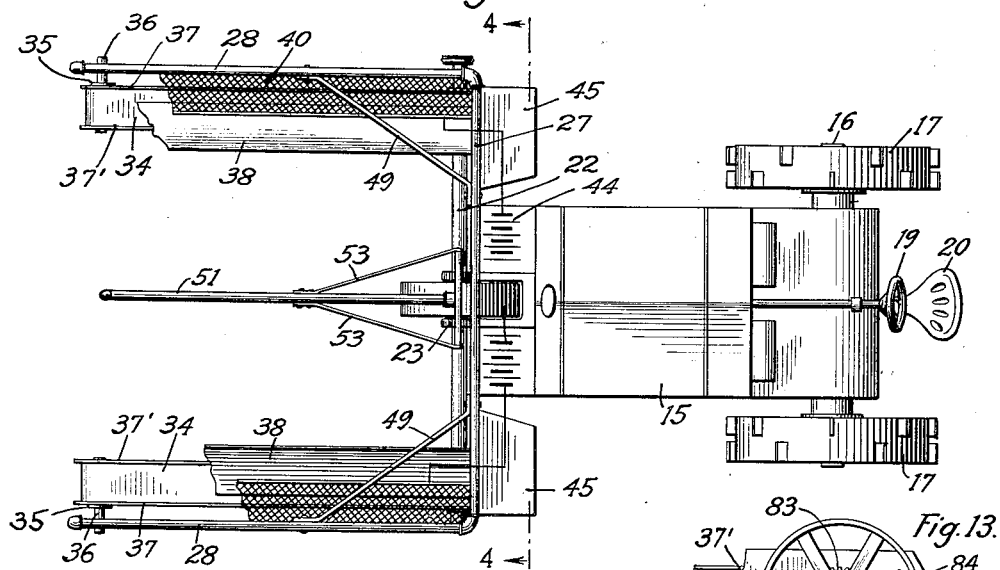
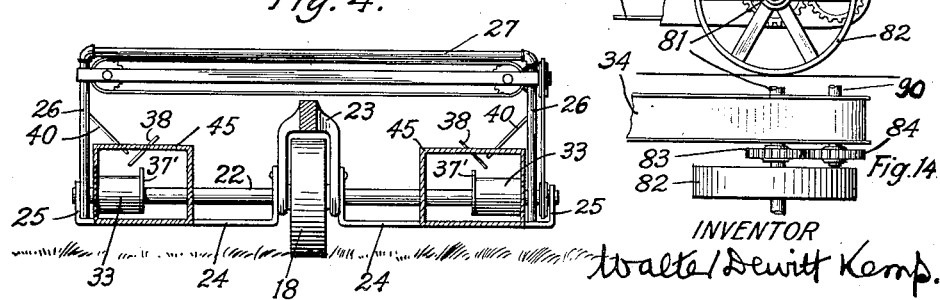

W. D. KEMP.
GRASSHOPPER HARVESTER.
APPLICATION FILED JAN. 9, 1919.
1,325,475.
Patented Dec. 16, 1919.
3 SHEETS—SHEET 3.
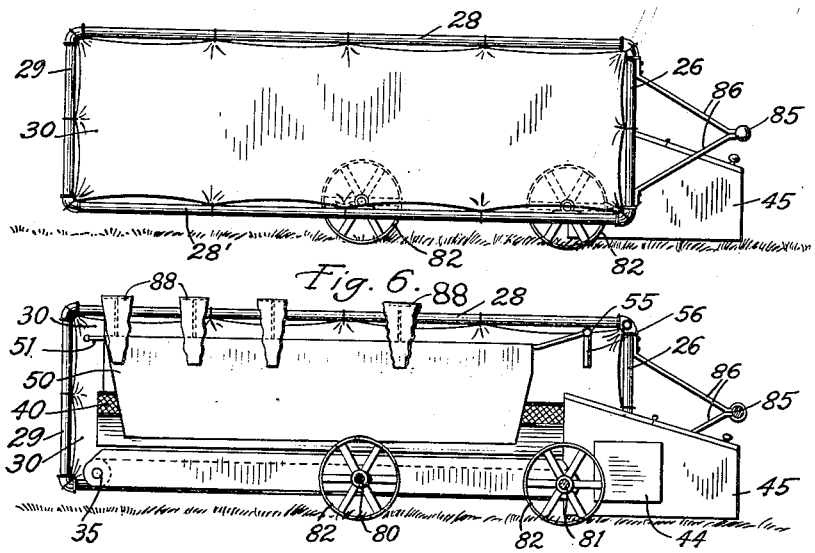
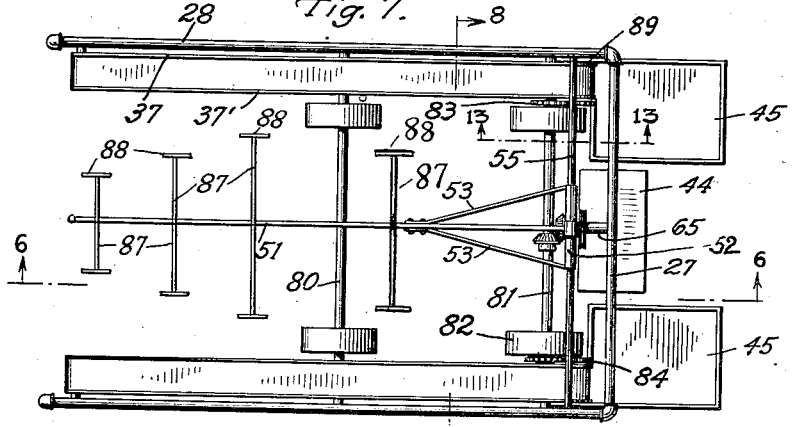
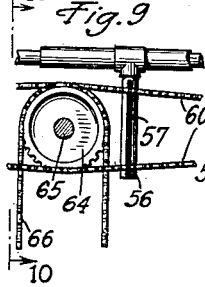
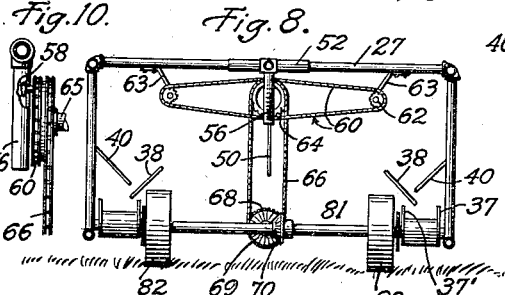
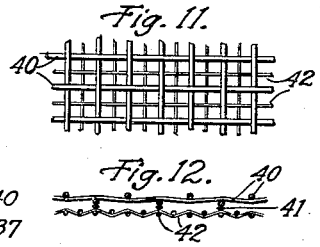
INVENTOR
Walter Dewitt Kemp.

UNITED STATES PATENT OFFICE.

WALTER DEWITT KEMP, OF NEW YORK, N. Y.

GRASSHOPPER-HARVESTER.

1,325,475.   Specification of Letters Patent.   Patented Dec. 16, 1919.

Application filed January 9, 1919. Serial No. 270,280.

*To all whom it may concern:*

Be it known that I, WALTER DEWITT KEMP, a citizen of the United States, residing at New York, in the county of New York and State of New York, have invented certain new and useful Improvements in Grasshopper-Harvesters, of which the following is a specification.

This invention relates to improvements in agricultural implements, and has as its special object the provision of an apparatus capable of moving over the surface of land, irrespective of growing crops, grain or grass, the apparatus being adapted to collect insects, particularly of the grasshopper type, upon a large scale, electrocute the same, and finally, to deliver the freshly killed insects in a mass, in their natural state (*i. e.* without poison), in order that they may be utilized subsequently for poultry food.

It is a well known fact that throughout the extensive level tracts of land in the western and southern States, the fields are frequently infested during the summer months with enormous quantities of these insects, the same being highly destructive to grain and growing crops in general—in fact to such an extent as to detrimentally affect farmers, causing a serious loss of crops.

It is also known that such insects are eaten with avidity by poultry, both in the fresh state and when dried, the same having a fattening effect and acting as a stimulating food, leading to the general healthfulness of the fowls and especially to a greatly increased production of eggs.

Thus the invention serves two distinct purposes—to relieve farmers of a dangerously destructive pest, and to furnish a poultry food of high order.

These objects and purposes are attained by such construction and combination of parts and principles as are hereinafter described, and graphically shown in the accompanying drawings, which are to be considered merely as descriptive and explanatory rather than as restrictive or limitative, and in which:

Fig. 2 is a side elevational view of the same;

Fig. 3 is a top plan view thereof, certain parts being omitted and others broken away to show the construction;

Fig. 4 is a transverse sectional view taken on the line 4—4 of Fig. 3;

Fig. 5 is a side elevational view showing a hand operated type of the implement;

Fig. 6 is a vertical sectional view taken substantially on the line 6—6 of Fig. 7;

Fig. 7 is a top plan view of the hand operated implement, certain parts being omitted;

Fig. 8 is a transverse sectional view taken on the line 8—8 of Fig. 7;

Fig. 9 is a fragmentary sectional view showing the reciprocating screen driving means;

Fig. 10 is a transverse sectional view taken on the line 10—10 of Fig. 9;

Fig. 11 is a fragmentary plan view of the electrocuting device;

Fig. 12 is a top plan view of the same;

Fig. 13 is a fragmentary longitudinal sectional view, taken on the line 13—13 of Fig. 7;

Fig. 14 is a top plan view of the same.

Similar numerals of reference indicate corresponding parts in the several views.

Figure 1:
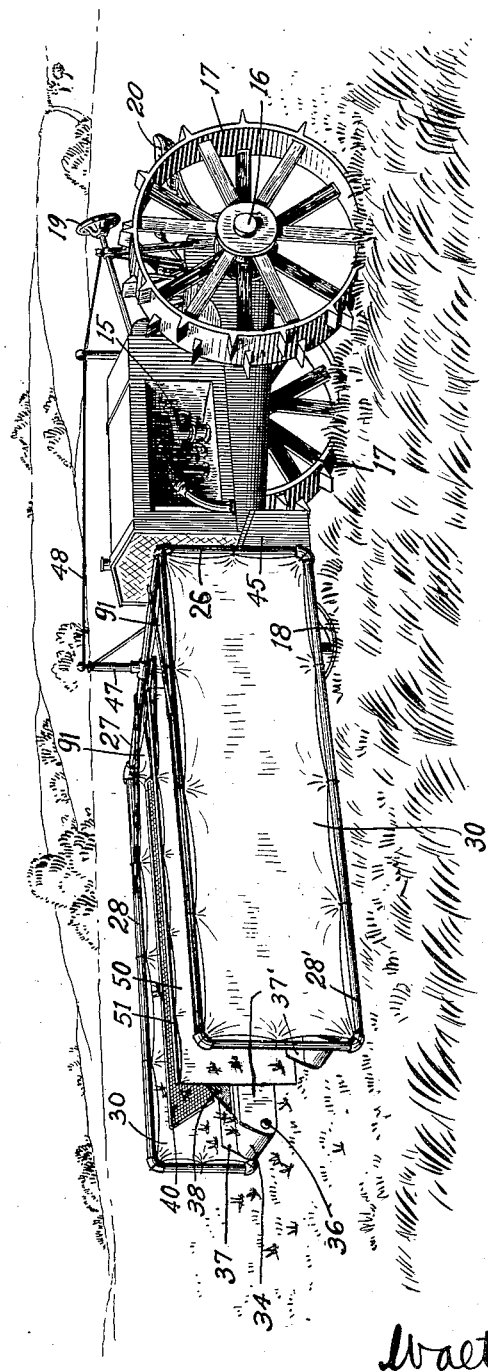
Figure 1 is a perspective view showing an implement made in accordance with the invention and indicating its attachment to a farm tractor by which it is propelled.

Referring to the drawings, Figs. 1 to 4 inclusive will be seen to show a motor driven apparatus, the same including a tractor comprising a motor 15, mounted upon an axle 16 at the rear, rigidly engaged with traction wheels 17, while at the front of the motor is a single dirigible wheel 18, controlled by the hand steering wheel 19, arranged in the usual manner of tractors, adjacent to the operator's seat 20. The front, dirigible wheel 18 is rigidly secured upon axle 22, between the side elements of a U shaped support frame 23. Pivotally engaged with the motor casing and rigidly secured to the outer sides of the frame 23 are a pair of laterally extending supports 24, having upturned ends 25, forming bearings into which the axle 22 extends. Carried by the supports 24 are the vertical elements 26 of a frame connected at the top by a transverse member 27, from which extend toward the front, pairs of horizontal elements 28 and 28', and extending therebetween at the front are vertical end elements 29, forming rectagular side frames, preferably formed of light steel tubes, and engaged between said side frame elements are fixed curtains 30, made of textile material. Secured to the transverse element 27 and the vertical members 26, is a fixed cross curtain or insect driving member 91, also of textile material.

Fixed upon the axle 22, near its outer ends, are pulleys 33, over which run endless bands or conveyers 34, passing over similar pulleys 35 at the extreme front of the machine; these latter pulleys are freely rotatable upon studs 36, fixed in the frame sides. In order to prevent the electrocuted insects from passing off of the traveling conveyers 34, guide strips 37 and 37' are provided closely adjacent to each edge of the conveyers. Immediately above the inner guide strips 37' are diagonally disposed plates 38, supported in any convenient manner from the side frames, while immediately above them are the lower edges of oppositely disposed composite electrified screens or metallic nettings the upper edges of which are adjacent to the curtains, said nettings extending diagonally inward from the side. These electrified nettings extend upwardly as high as the curtains, but for simplicity of illustration are here shown as extending upwardly only a short distance. The nettings are comprised of independent sections arranged in juxtaposed relation, the outer section 40 being separated from the inner section 42 by insulators 41, the inner section 42 being charged with a current of electricity conveyed by conductors 43 from an electric battery 44 carried at the rear of the machine, thus providing means for electrocuting the insects as they light upon the nettings, their limbs or bodies making a circuit between the live wires, causing their instant death. These inclined nettings are of such mesh that the hoppers cannot fall through the same, but slide down over the top surface thereof, and from the lowermost sections they drop upon the inclined guide plates 38, which guide plates may be of similar electrified nettings, and are delivered by said plates to the moving conveyers 34, which carry the electrocuted hoppers rearwardly and deposit them in receptacles 45, carried at the rear corners of the apparatus.

In order to further support the frame, a post 47 may be fixed centrally on the upper transverse member 27, and a cable 48 engages the upper end of the post with the motor casing 15, the cable being arranged to carry a portion of the weight in the manner of a stress or guy rope. Attached between the member 27 and the upper elements 28 of the side frames are rigid braces 49, whereby the structure is materially stiffened; this is rendered necessary as the structure is of considerable magnitude and the side elements may be several rods apart, in order that the operation may be performed on a large scale.

In order to cause the grasshoppers to leap upon or against the electrocuting devices extending along either side of the harvester, a movable, vertical screen 50 is provided, made of any selective material, and attached along its upper edge to a light pole 51, formed with a transverse hollow head or sleeve 52, to which it is further secured by the braces 53, the sleeve being slidable along a fixed rod 55, extending between the side elements at the rear, or slidable directly upon the transverse member 27. To the screen support pole 51 are secured light cross arms 87, as more particularly shown in Fig. 7, these arms extending in each direction from, and at approximately right angles to, the pole 51. Attached in any convenient manner to the ends of these arms are small secondary or auxiliary screen members 88, of the nature of banners or pennants, made of textile material, such as canvas, and hung substantially parallel to the main screen 50. The cross-arms 87 are rigidly secured to the pole 51, and extend at a slight angle upwardly therefrom, in order that the ends of said arms, from which the small screens depend, will be higher than the upper side element 28, so that said ends may pass over the member 28, when, through the actuation of the main support pole 51, the small screens have respectively finished their work and have reached such point; the small screens themselves, being of flexible material, are readily carried over the top side members of the apparatus.

Attached centrally to the sleeve 52 is a downwardly extending vertical stem 56, containing an open slot 57, in which is slidably engaged a pin 58, fixed in a chain 60, trained over a pair of sprockets 62, supported by brackets 63, attached to the transverse rail 27, near the sides of the structure, the chain being driven by a double sprocket 64, mounted on a spindle 65 at the center of the frame, the other portion of the double sprocket 64 being driven by a chain 66, trained over a driving sprocket 68, mounted on a short, longitudinal spindle 69 at the rear; the spindle 69 is driven by bevel gears 70, meshing with mating gears fixed upon the axle 22. Thus, action is conveyed to the screen 50 and the auxiliary screens 88, causing all the screens to reciprocate from side to side.

On each of the axles 22 and 81, there are fixed spur gears 83 meshing with mating gears 84, secured on spindles 90, rotatably mounted in the frame and conveying rotary motion to the drums 89, over which are trained the endless belts 34, the same being driven thereby so as to conduct the insects into the receiving chambers 45.

The operation of the invention will be briefly described. When the implement begins to move forward over a field, it will be seen that the rear cross curtain 91 thereof, begins to scare up whatever grasshoppers are in its path, and causes them to leap forward successively. Simultaneously, the screen 50, carrying its auxiliary screens, begins to move laterally across the rectangular space of ground inclosed by the apparatus; these screens scare up what hoppers are in front of them, and similarly force the hoppers to keep leaping over the ground. These hoppers are jumping toward the electrocuting devices on the side of the machine toward which the screens are traveling. The hoppers being driven along by the rear curtain are now picked up, diverted, and driven crosswise by the screens in their cross travel. When the small screens have respectively forced the hoppers they are driving to leap upon or against the wires, said screens are so disposed that they pass on over the side of the machine, and the main screen keeps approaching the wires. It will be apparent that when it approaches near enough to the wires, the remaining hoppers which it is driving, will be forced to leap against the wires. Thus, all the insects within the rectangular space inclosed by the implement at the time the screens began to move toward said side of the machine, will now have been electrocuted. The screen now automatically reverses, and carrying back its auxiliary screens, they begin to travel toward the electrocuting devices on the opposite side of the machine, and, coöperating again with the rear curtain, similarly force the grasshoppers on this new ground into contact with the wires on this side; when the main screen reaches a corresponding point here, the screens again reverse. The function of the auxiliary screens 88 is to drive the hoppers in the immediate path of said screens against the wires, and thus dispose of a large number of the hoppers before the place in the field where these hoppers originally were is reached by the main screen. If there were only the one main screen, when it reached its final position before the wires the whole swarm of flying or leaping insects would be driven against the wires at about the same time, and those which reached the wires a fraction of a second first would form a cover or blanket over the wires from the time they first struck the nettings until they left the same by sliding off of the lowermost sections thereof, and would thus create an obstacle to the immediately following waves of hoppers reaching the wires direct, and many of these latter would escape. It should be noted that these auxiliary screens are very small as compared to the main screen, and that a space is left between each auxiliary screen lengthwise of the main screen so that the hoppers in said spaces will not be molested by the small screens; and that the small screens are variously located at different distances from the main screen, in order that the hoppers driven by the individual small screens will reach the wires at a different time from the main screen hoppers and also from the other small screen hoppers.

The rear curtain and the screens will thus be seen to coöperate to force the hoppers from two directions at the same time, in such a manner that the field is swept clean, and the hoppers from no portion of the ground being worked are missed or lost. The screen reciprocating means is so adjusted that the main screen travels from its limit of travel on one side of the machine to its limit of travel on the other side of the machine in the length of time required for the rear curtain 91 to travel forward the distance between said curtain and the extreme forward ends of the electrocuting devices. Thus, it is not necessary for the harvester to stop its travel at any time, but, as the operation is completed on the half-cycle of the screens, it may move forward continually and "cut" or gather a clean swath of hoppers across the field. It may be said that a line or marker may be employed in the field to indicate the edge of the swath, so that on its next round, the implement will not overlap ground already worked; and that all of the side members of the combination are preferably camouflaged by paint to represent the natural habitat of the grasshopper, while the hopper driving screens and rear curtain are preferably white.

It will thus be apparent that all of the grasshoppers in the path of the harvester are eventually driven into contact with the live wires and are skilled in such a manner as to permit of being removed and dried, and subsequently utilized as food for poultry, etc.

It should be noted that the rear end of the screen 50 operates closely adjacent to the rear curtain 91, so that no space is left therebetween through which the grasshoppers might leap; that the electrocuting devices extend downwardly to immediately above the conveyer belts 34, and the conveyer members are constructed as close to the ground as will permit of the belt operating, so that no space is left here through which hoppers might escape; that the members 38 should be quite narrow in order not to present an obstacle to those hoppers with reference to which, said members would be in their path as they leap from the ground toward the nettings; that the screens and the wire nettings of the implement are of such height that hoppers cannot leap over them; and that the screens and rear curtain extend to the ground, so that no hoppers can escape thereunder.

In the hand propelled type, as shown more particularly in Figs. 5, 6 and 7, the frame is mounted upon front and rear axles, respectively 80 and 81, on which are secured wide faced support wheels 82. The rear axle is similar to, and used for the same purposes as, the axle 22 above described. This type of machine is propelled by handles 85, supported by rearwardly extending brackets 86, attached to the rear vertical frame elements 26, the implement being pushed along over the ground. In all other essential respects, the construction and operation of the hand type and of the motor driven type is the same.

It may be added that the function of the side curtain elements is to prevent particles of hay or other material from blowing against or coming in contact with the electrocuting devices or conveyer members, and to protect the harvester generally.

The disclosure is not to be regarded as restrictive or limitative of the invention, of which obviously embodiments may be constructed including minor modifications from the specific forms shown and described, without departing from the general scope herein indicated and hereinafter claimed; and the several elements of the apparatus may be constructed of any suitable and selective kind of material, and may be made in any size, shape or form desired, so long as the various members of the combination co-act and coöperate to perform the functions and produce the results herein contemplated, without departing from the spirit of the invention.

I claim:

1. A grasshopper harvester, comprising a wheeled frame having raised longitudinally extending sides, electrocuting devices extending coincidently adjacent to the inner surface of said sides, and pendantly supported waving elements adapted to drive grasshoppers into contact with said electrocuting devices.

2. A grasshopper harvester, comprising a wheeled skeleton frame and means for its propulsion, a pair of curtains covering the sides of said frame, a curtain covering the rear of said frame, a vertical screen movable laterally between said side curtains, means for actuating said screen, electrocuting devices arranged adjacent to said side curtains, endless conveyers movable below said electrocuting devices, and receptacles into which said conveyers lead.

3. A grasshopper harvester, comprising a wheeled skeleton frame and means for propelling and guiding said frame, guard elements upon each side of said frame, a screen extending coincidently with said guard elements and movable in a plane parallel therewith, means for moving said screen reciprocatively, endless traveling conveyers movable longitudinally of said guard elements closely adjacent therebelow, receivers into which said conveyers deliver, a source of electrical energy, and metallic nettings over said conveyers, said nettings being comprised of wires engaged alternately with positive and negative wires leading from said electric source.

4. A grasshopper harvester, comprising a wheeled skeleton frame and means for propelling and guiding said frame, electrified guard elements upon each side of said frame, a screen extending coincidently with said guard elements and movable in a plane parallel therewith, means for moving said screen reciprocatively, endless traveling conveyers movable longitudinally of said guard elements closely adjacent therebelow, receivers into which said conveyers deliver, a source of electrical energy, and metallic nettings over said conveyers, said nettings being comprised of wires engaged alternately with positive and negative wires leading from said electric source.

5. A grasshopper harvester, comprising a truck having a pair of widely spaced side elements extending at the front, a transverse element extending between the rear ends of said side elements, endless conveyers movable adjacent to the lower edges of said side elements, containers into which said conveyers discharge, electrically charged screens disposed over said conveyers, guard plates coöperative with said screens, and a movable screen operative in a plane parallel between said side elements, the rear end of said screen operative closely adjacent to said transverse element, said movable screen being actuated by the movement of said truck.

6. A grasshopper harvester, comprising a pair of spaced vertical curtains, a vertical cross curtain extending therebetween, frames on which said curtains are stretched, a longitudinal screen movable laterally between said spaced curtains, means for supporting said curtains, a truck on which said frame and screen support is mounted, means for actuating said truck, and means combined therewith for reciprocatively oscillating said screen.

7. A grasshopper harvester, comprising a truck and means for propulsion therefor, a pair of vertical side walls extended in advance of said truck, an arm movable in parallel between said walls, a vertical rear wall extending transversely between said side walls, means for moving said arm reciprocatively, a screen depending from said arm, cross arms on said arm, secondary screens depending from said cross arms, means carried on said truck for electrocuting insects, and means for gathering and disposing of the insects.

8. A grasshopper harvester, comprising a wheeled frame having a pair of spaced vertical side walls open at the top and bottom, a vertical rear wall extending therebetween, a screen movable between said side walls in a palne parallel thereto, means operatively combined with the wheels of said frame for actuating said screen, means carried by said frame adjacent to said side walls adapted to destroy the life of insects alighting thereon, and means for collecting, conveying and disposing of insects so destroyed.

9. A grasshopper harvester, comprising a wheeled frame having a pair of spaced vertical side walls open at the top and bottom, a transverse vertical wall extending between the rear ends of said side walls, an arm movable reciprocatively between said side walls in a plane parallel thereto, the rear end of said arm movable closely adjacent to said transverse wall, means for actuating said arm operatively combined with the wheels of said frame, a main screen secured to said arm, rods extending upward from said arm, cross arms at the end of said rods, smaller screens depending therefrom at different distances laterally from the main screen, substantially parallel therewith, and means for destroying insects carried by said frame.

In testimony whereof I have hereunto subscribed my name, in the presence of two witnesses, this 8th day of January, 1919.

WALTER DEWITT KEMP. [L. S.]

Witnesses:
 THEODORE M. GIBBONS,
 JAMES A. MCNAMARA.